US 8,449,020 B2

(12) United States Patent
Schneider et al.

(10) Patent No.: US 8,449,020 B2
(45) Date of Patent: May 28, 2013

(54) STRUCTURAL REINFORCEMENTS

(75) Inventors: Dean J. Schneider, Washington, MI (US); Joseph L. Bolton, Troy, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/412,668

(22) Filed: Mar. 6, 2012

(65) Prior Publication Data

US 2012/0164358 A1 Jun. 28, 2012

Related U.S. Application Data

(63) Continuation of application No. 13/043,691, filed on Mar. 9, 2011, now Pat. No. 8,127,506, which is a continuation of application No. 11/781,587, filed on Jul. 23, 2007, now Pat. No. 7,913,467.

(60) Provisional application No. 60/820,295, filed on Jul. 25, 2006.

(51) Int. Cl.
*B62D 25/00* (2006.01)

(52) U.S. Cl.
USPC ............ 296/187.02; 296/205; 52/232; 52/847

(58) Field of Classification Search
USPC ....... 52/232, 834, 843, 844, 847; 296/187.01, 296/187.02, 187.03, 193.06, 203.1, 203.03, 296/204, 205; 29/897.2; 248/200, 214, 682; 428/34.1, 184
See application file for complete search history.

(56) References Cited

U.S. PATENT DOCUMENTS

| 3,813,071 | A | * | 5/1974 | Noryd ............................. 248/251 |
| 3,987,904 | A | * | 10/1976 | Height et al. ................ 211/105.1 |
| 4,861,097 | A | | 8/1989 | Wycech et al. |
| 5,274,006 | A | | 12/1993 | Kagoshima et al. |
| 5,358,397 | A | | 10/1994 | Ligon et al. |
| 5,506,025 | A | | 4/1996 | Otto et al. |
| 5,631,027 | A | * | 5/1997 | Takabatake ..................... 425/4 R |
| 5,755,486 | A | | 5/1998 | Wycech et al. |
| 5,806,915 | A | * | 9/1998 | Takabatake ................ 296/187.02 |
| 5,992,923 | A | | 11/1999 | Wycech et al. |
| 6,003,274 | A | | 12/1999 | Wycech et al. |
| 6,146,565 | A | * | 11/2000 | Keller ............................. 264/46.5 |

(Continued)

FOREIGN PATENT DOCUMENTS

| DE | 202004009473 U1 | 10/2004 |
| EP | 0518253 A2 | 12/1992 |

(Continued)

OTHER PUBLICATIONS

Peter Born; Bernd Mayer Structural Bonding in Automotive Applications, Automotive Technology, 44-47, Apr. 2004.

(Continued)

*Primary Examiner* — Robert Canfield
(74) *Attorney, Agent, or Firm* — The Dobrusin Law Firm, PC

(57) ABSTRACT

The present invention is predicated upon the provision of systems and methods for reinforcement of a structural member. More particularly, the present invention is predicated upon unique carrier configurations and application of reinforcing material thereto. In one configuration, the application of reinforcing material is achieved without the use of fasteners, adhesives, or both, for placement, locating and restrictive movement of the reinforcing material onto the carrier.

7 Claims, 8 Drawing Sheets

U.S. PATENT DOCUMENTS

| | | | |
|---|---|---|---|
| 6,186,581 B1 * | 2/2001 | Onoue | 296/187.01 |
| 6,199,940 B1 | 3/2001 | Hopton et al. | |
| 6,253,524 B1 | 7/2001 | Hopton et al. | |
| 6,332,731 B1 | 12/2001 | Wycech et al. | |
| 6,368,438 B1 | 4/2002 | Chang et al. | |
| 6,387,470 B1 | 5/2002 | Chang et al. | |
| 6,467,834 B1 | 10/2002 | Barz et al. | |
| 6,519,854 B2 | 2/2003 | Blank | |
| 6,546,693 B2 | 4/2003 | Wycech | |
| 6,641,208 B2 | 11/2003 | Czaplicki et al. | |
| 6,649,243 B2 | 11/2003 | Roberts et al. | |
| 6,729,425 B2 * | 5/2004 | Schneider et al. | 180/68.5 |
| 6,846,559 B2 | 1/2005 | Czaplicki et al. | |
| 6,880,657 B2 | 4/2005 | Schneider et al. | |
| 6,921,130 B2 | 7/2005 | Barz et al. | |
| 6,941,719 B2 | 9/2005 | Busseuil et al. | |
| 7,025,409 B2 | 4/2006 | Riley et al. | |
| 7,048,019 B2 | 5/2006 | Pacitto et al. | |
| 7,090,273 B2 * | 8/2006 | Stojkovic et al. | 296/29 |
| 7,114,763 B2 | 10/2006 | Riley et al. | |
| 7,141,194 B1 | 11/2006 | Beckmann et al. | |
| 7,160,491 B2 | 1/2007 | Barz et al. | |
| 7,422,088 B2 * | 9/2008 | Ito | 181/198 |
| 7,644,547 B2 * | 1/2010 | Bonshor | 52/209 |
| 8,215,704 B2 * | 7/2012 | Monnet et al. | 296/187.02 |
| 2002/0074827 A1 | 6/2002 | Fitzgerald et al. | |
| 2005/0249936 A1 * | 11/2005 | Ui et al. | 428/304.4 |
| 2005/0276970 A1 | 12/2005 | Busseuil et al. | |
| 2005/0279567 A1 * | 12/2005 | Ito | 181/207 |
| 2006/0043772 A1 * | 3/2006 | Richardson | 296/187.02 |
| 2008/0099275 A1 * | 5/2008 | Seel | 181/202 |

FOREIGN PATENT DOCUMENTS

| | | |
|---|---|---|
| EP | 0775721 A1 | 5/1997 |
| EP | 1149679 A2 | 10/2001 |
| EP | 1359004 A1 | 11/2003 |
| FR | 2884200 A | 10/2006 |
| JP | 57117542 A | 7/1982 |
| WO | 00/55444 A1 | 9/2000 |
| WO | 01/42076 A1 | 6/2001 |
| WO | 2008/014250 A1 | 1/2008 |

OTHER PUBLICATIONS

Gregory W. Hopton; Philip E. Weber; Leslie J., Application of a Structural Reinforcing Material to Improve Vehicle NVH Characteristics, SAE Technical Paper Series, 1999-01-3223, Detroit, MI, Sep. 1999.

Kurt Lilley; Eric Seifferlein; Anita Zalobsky Comparison of Preformed Acoustic Baffles and Two-Component Polyurethane Foams for Filling Body Cavities 2001.

Kurt M. Lilley; Michael J. Fasse; Philip E. Weber A Comparison of NVH Treatments for Vehicle Floorplan Applications, 2001.

Kurt M. Lilley; Phil E. Weber Vehicle Acoustic Solutions May 5-8, 2003.

Gina Mansour and Chin Jui Chang Optimal Bonding Thickness for Vehicle Stiffness 2001.

"International Preliminary Report on Patentability, Dated Jul. 24, 2007, Application No. PCT/US2007/074205".

* cited by examiner

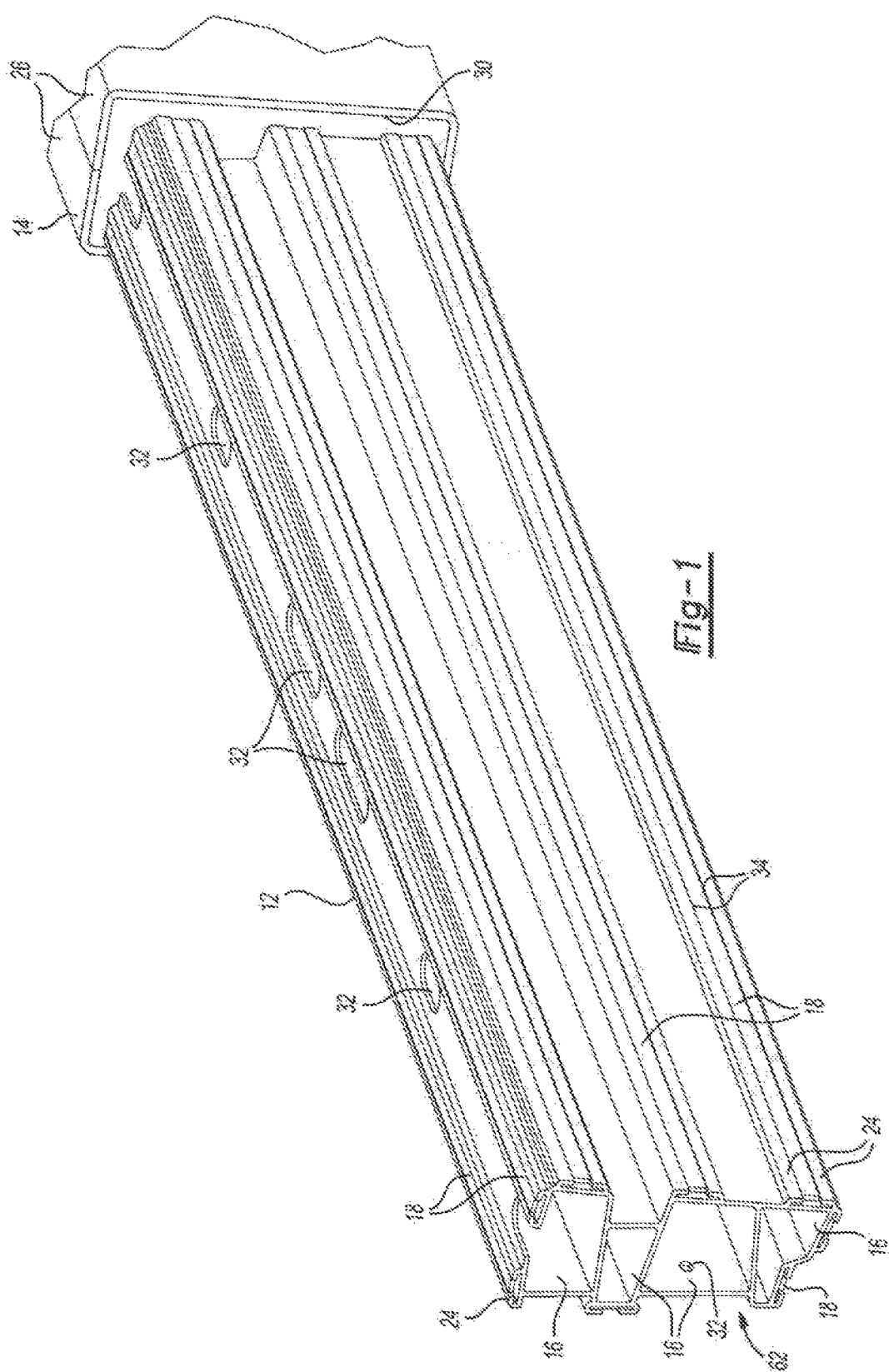

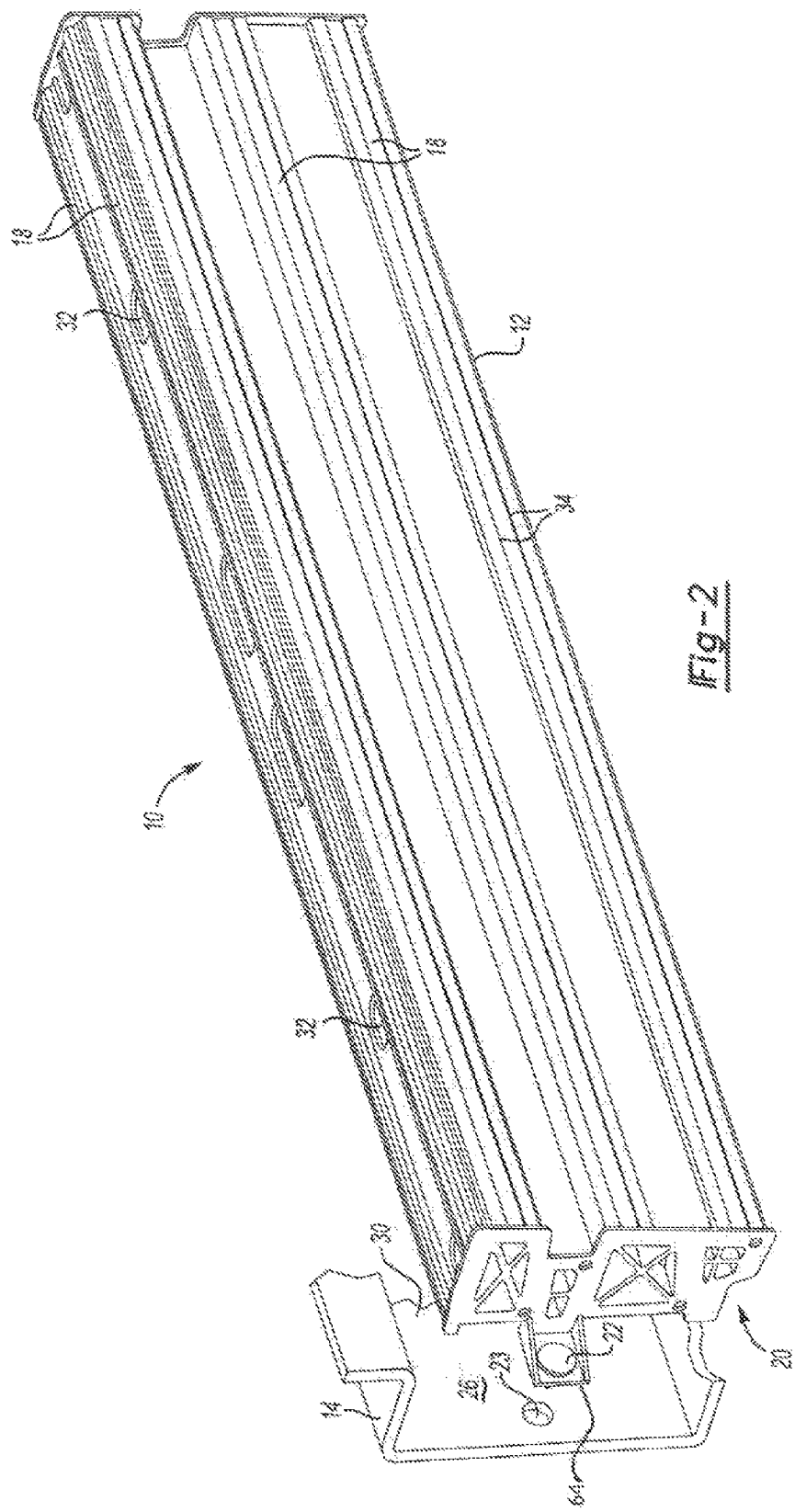

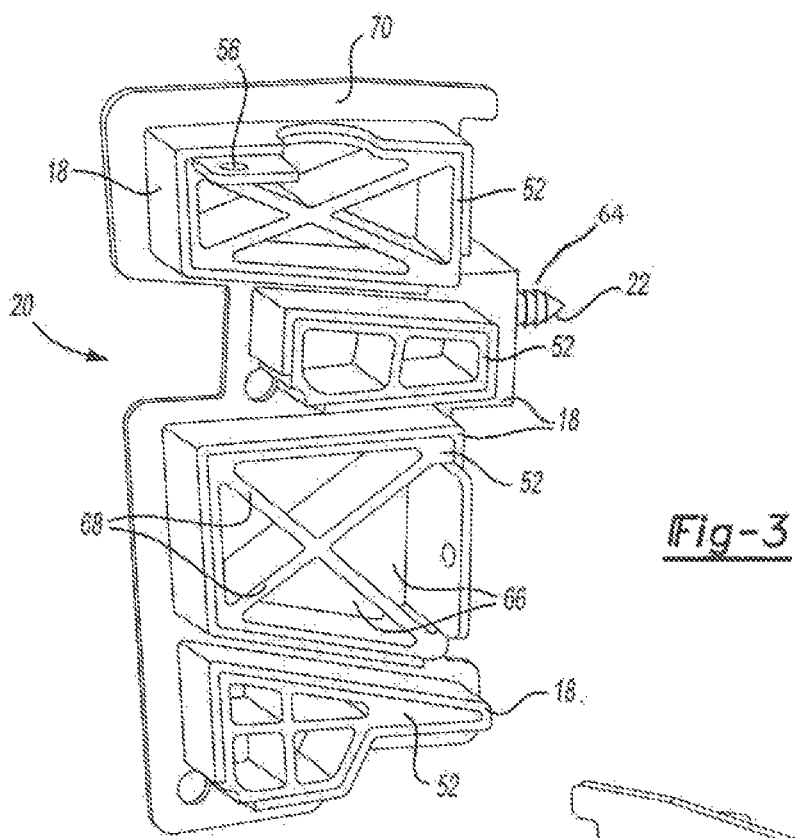
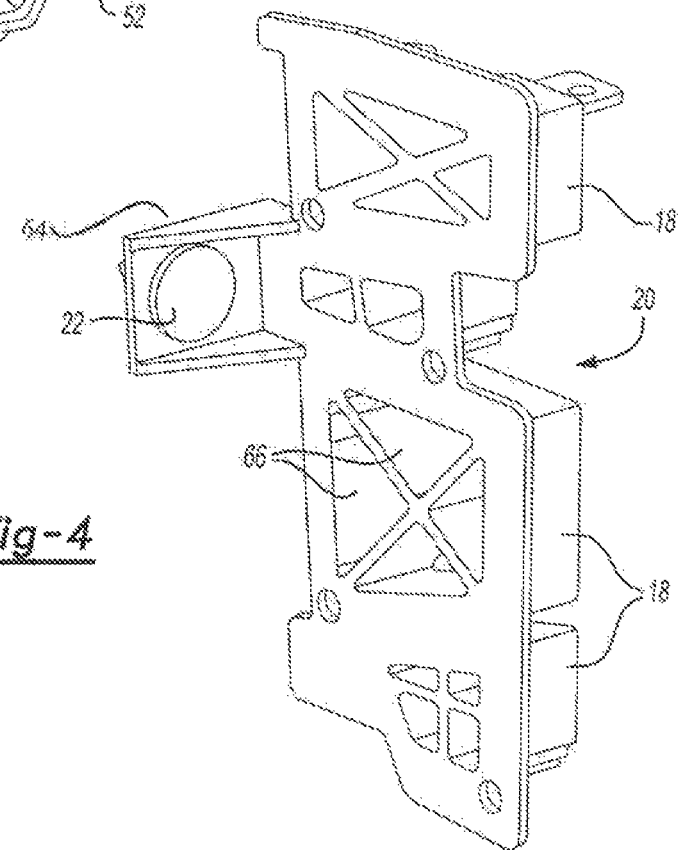

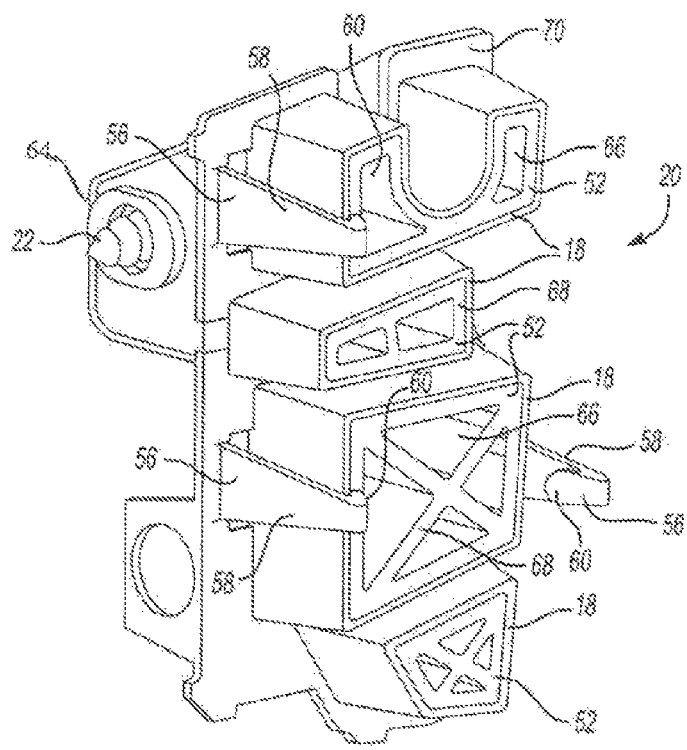
Fig-7
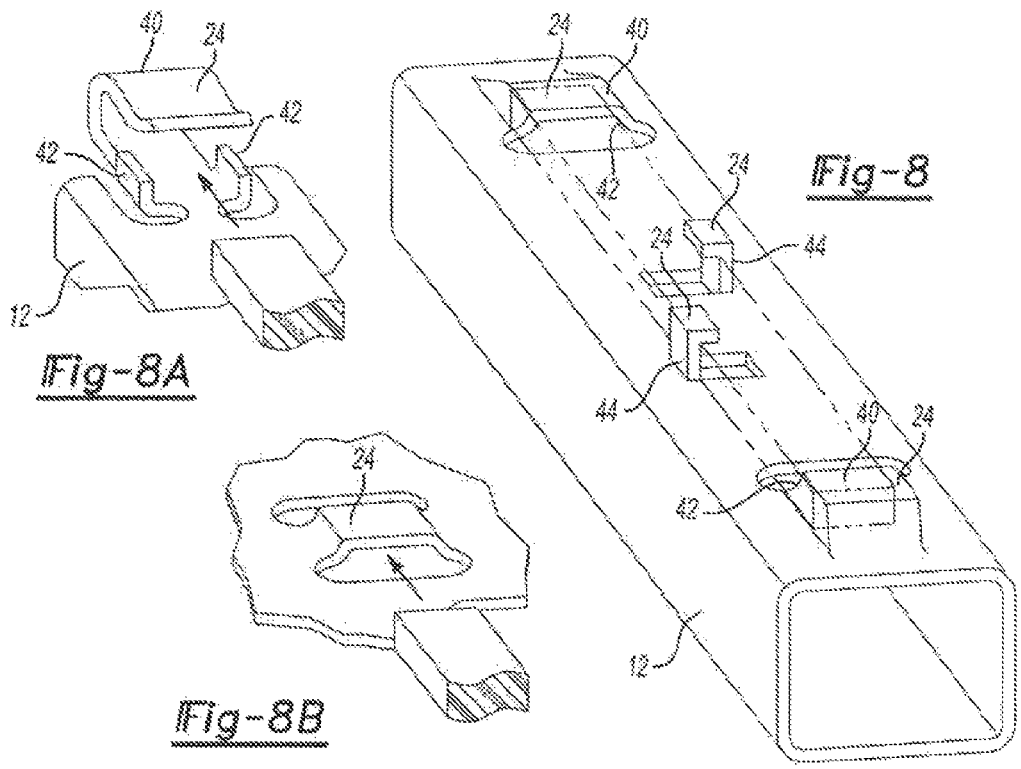
Fig-8
Fig-8A
Fig-8B

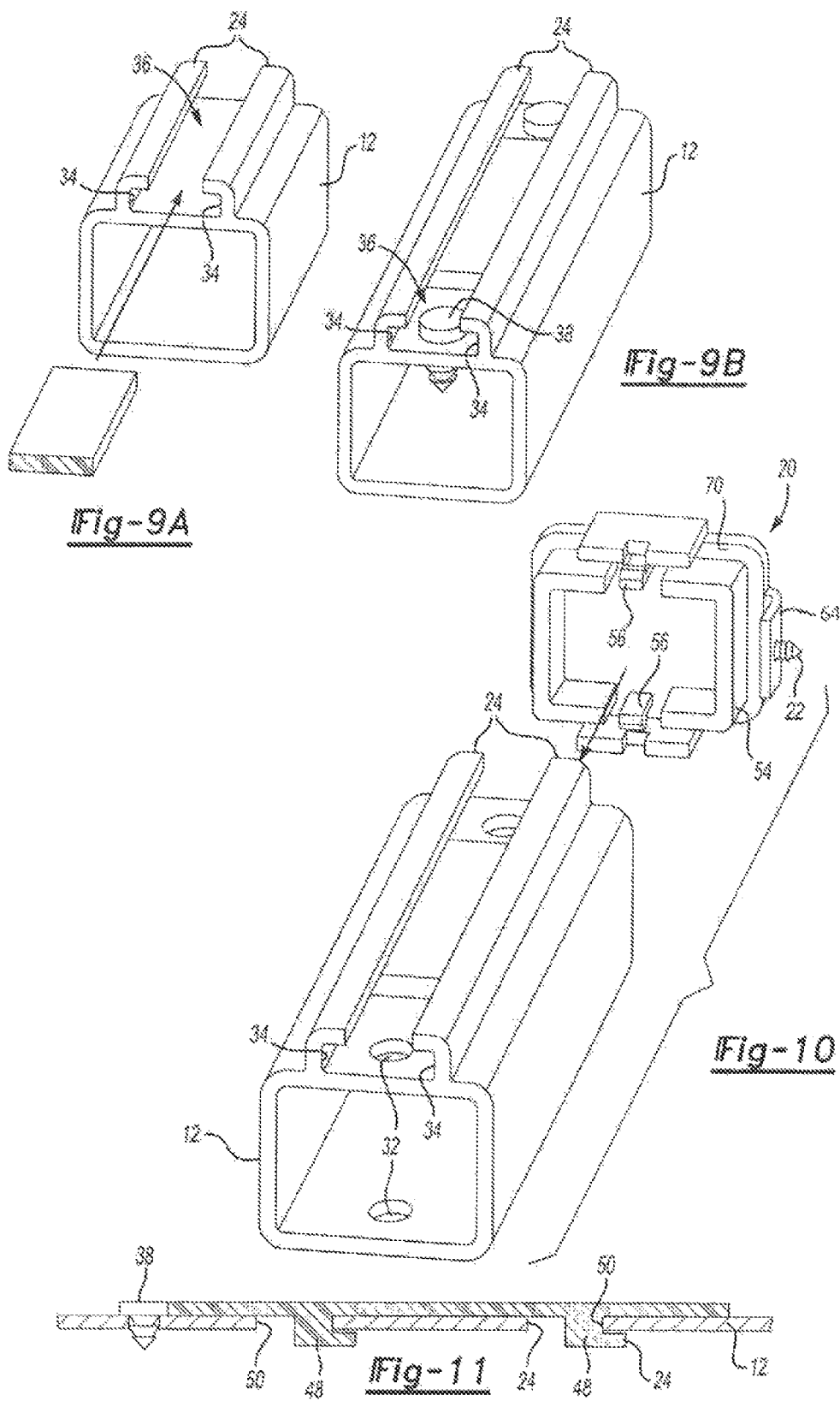

STRUCTURAL REINFORCEMENTS

CLAIM OF PRIORITY

This application is a continuation of U.S. patent application Ser. No. 13/043,691, filed Mar. 9, 2012 (now U.S. Pat. No. 8,127,506), which is a continuation of Ser. No. 11/781,587 filed Jul. 23, 2007 (now U.S. Pat. No. 7,913,467), which claims the benefit of the filing date of U.S. Provisional Application No. 60/820,295, filed Jul. 25, 2006, all of which are incorporated herein by reference for all purposes.

FIELD OF THE INVENTION

The present invention is predicated upon the provision of a system and method for reinforcement of a structural member, which includes restrictors for assisting in the placement, locating and restrictive movement of activatable material on a carrier. In one particular aspect, the system and method is achieved without the use of fasteners, adhesives, or both, for placement, locating and restrictive movement of the activatable material on the carrier.

BACKGROUND OF THE INVENTION

For many years industry, and particularly the transportation industry has been concerned with providing functional attributes sealing, baffling, acoustic attenuation, sound dampening and reinforcement to articles of manufacture such as automotive vehicles. In turn, industry has developed a wide variety of materials and parts for providing such functional attributes. In the interest on continuing such innovation, the present invention seeks to provide an improved material and/or improved part for providing such functional attributes. The material and/or part can provide sealing, baffling, acoustic attenuation, sound dampening, combinations thereof or the like, but the part and/or material have been found to be particularly adept at providing reinforcement.

SUMMARY OF THE INVENTION

The present invention provides improved systems and methods for reinforcement of a structural member. The present invention includes unique carrier configurations and activatable material placed thereover for providing structural reinforcement.

In a first aspect, the present invention provides a reinforcement system for a structural member. The system includes a carrier member having a length extending along an axis between a first end and a second end. The carrier member also includes one or more sidewalls joined together to form one or more cavities extending along the axis, which forms a cross-sectional shape roughly corresponding to the cross-sectional shape of interior walls of a hollow structural member. The system also includes an activatable material placed over the carrier. The activatable material is configured to expand upon application of heat and adhere to the interior walls of the hollow structural member to provide reinforcement of the same. The system further includes one or more restricting features located on or integrated with the carrier member. The one or more restricting features are configured to receive the activatable material and limit movement of the activatable material with respect to the carrier.

In a second aspect, the present invention provides a reinforcement system for a structural member. The system includes a carrier member having a length extending along an axis between a first end and a second end. The carrier member includes one or more sidewalls joined together to form a plurality of cavities extending along the axis, which forms a cross-sectional shape roughly corresponding to the cross-sectional shape of interior walls of a hollow structural member. The system also includes an activatable material placed over the carrier. The activatable material is configured to expand upon application of heat and adhere to the interior walls of the hollow structural member to provide reinforcement of the same. The system further includes one or more caps located at the first, second or both ends of the carrier, wherein the one or more caps are configured to engage the end portion of the carrier.

In a third aspect, the present invention provides a reinforcement system for a structural member. The system includes a carrier member having a length extending along an axis between a first end and a second end. The carrier member also includes one or more sidewalls joined together to form a plurality of cavities extending along the axis and consecutively arranged along a height or width of the carrier, wherein the carrier member forms a cross-sectional shape roughly corresponding to the cross-sectional shape of interior walls of a hollow structural member. The system further includes a plurality of strips of activatable material placed over the carrier. The activatable strips are configured to expand upon application of heat and adhere to the interior walls of the hollow structural member to provide reinforcement of the same. The system further includes one or more restricting features integrally formed with the carrier member to form a unitary structure. The one or more restricting features are configured to receive the strips of activatable material and limit movement of the activatable material with respect to the carrier. The system further includes one or more caps located at the first, second or both ends of the carrier. The one or more caps configured for engaging the end portion of the carrier and include one or more attachment features for attaching the carrier member to the interior walls of the hollow structural member.

It should be appreciated that other features and aspects of the invention exist including methods of forming the system, methods of reinforcement of a structural member, or otherwise.

BRIEF DESCRIPTION OF THE DRAWINGS

FIG. 1 illustrates an exemplary embodiment of a reinforcement system according of the present invention.

FIG. 2 illustrates the system of FIG. 1 including exemplary end caps of the present invention.

FIGS. 3 and 4 illustrate perspective views of the end caps shown in FIG. 2.

FIG. 7 illustrates a perspective view of the end caps shown in FIG. 6.

FIG. 8 illustrates yet another exemplary embodiment of a reinforcement system of the present invention.

FIG. 8A-8D illustrates alternate configurations of the exemplary embodiment shown in FIG. 8.

FIGS. 9A, 9B and 10 illustrate still additional exemplary embodiments of the reinforcement system of the present invention.

FIG. 11 illustrates a cross sectional view taken through an exemplary embodiment of a reinforcement system of the present invention.

DETAILED DESCRIPTION

The present invention is predicated upon a system and method of reinforcing a structural member, particularly an automotive frame or frame rail member. In doing so, the present invention contemplates a carrier, having an activatable material place thereover, which is configured for placement within a hollow structural member. Subsequently, the activatable material is activated causing the carrier to attach to the structural member and provide reinforcement thereto.

In one configuration, the activatable material is supported and maintained on the carrier without the use of fasteners, adhesive bond, or both. With the present invention, the activatable material is restrictively placed on or over the carrier which limits or substantially limits movement of the activatable material relative to the carrier particularly during placement of the carrier into a cavity of a structural or otherwise. In doing so, the activatable material is secured with the carrier in the absence of a fastener.

Among the benefits achieved through this restrictive placement is the potential for a reduction in manufacturing costs. Furthermore, the present invention also reduces required time to assemble the reinforcement system by reducing or eliminating the steps of utilizing attachment features for attaching the activatable material to the carrier. Other benefits of the present invention will become apparent as shown and described herein.

Figure 5:
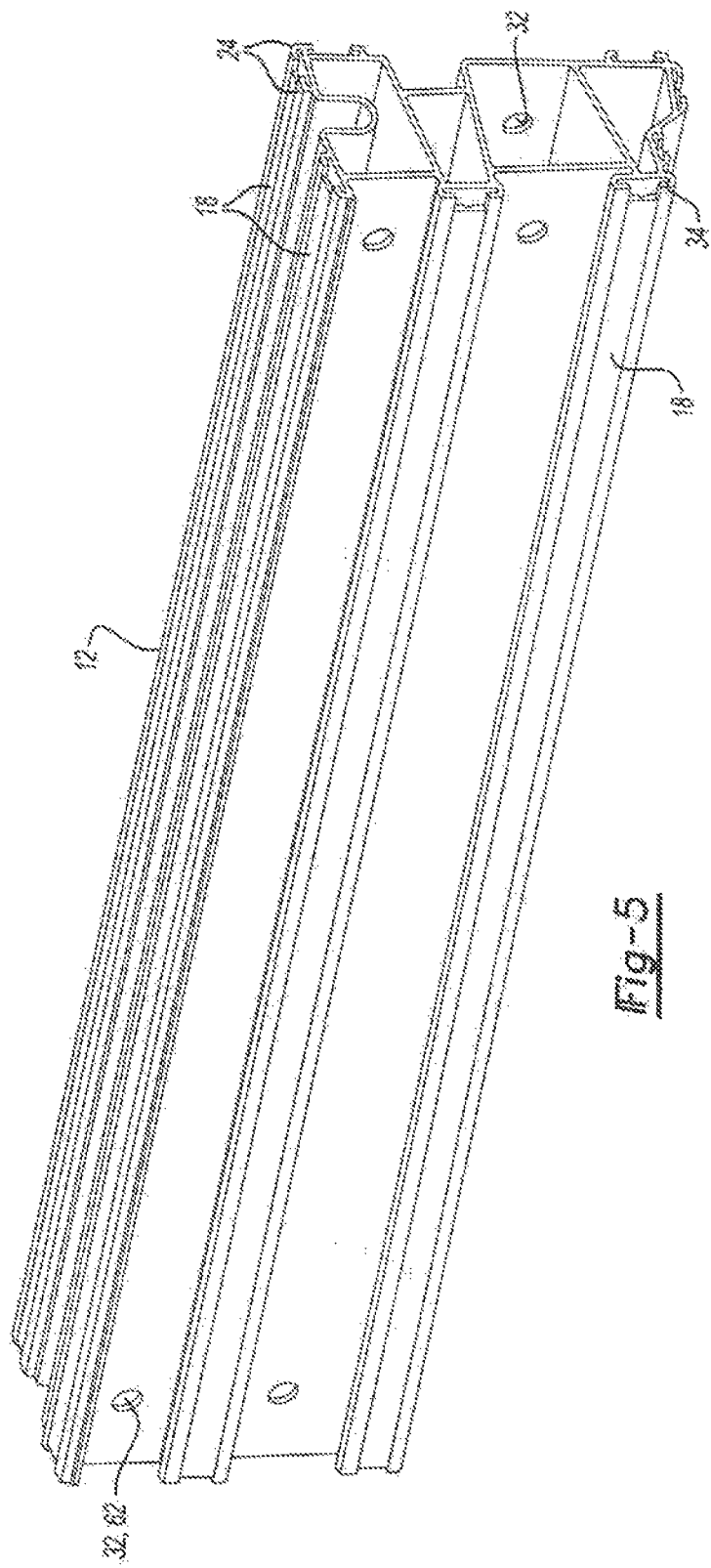
FIG. 5 illustrates another exemplary embodiment of a reinforcement system of the present invention.
Figure 6:
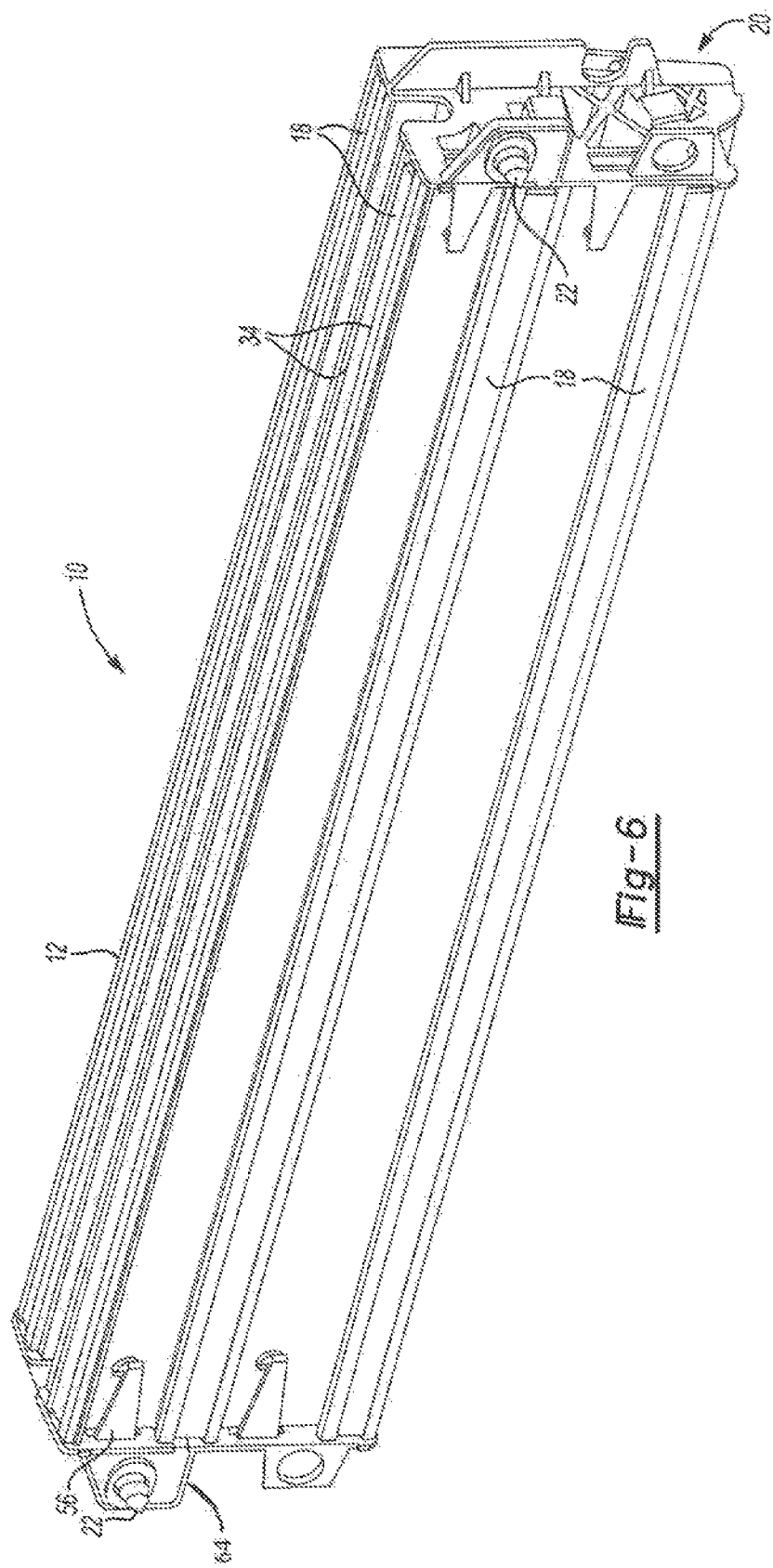
FIG. 6 illustrates the system of FIG. 5 including exemplary end caps of the present invention.

In one aspect, by example referring to FIGS. 1 and 5, the present invention contemplates an improved reinforcement system 10, including a carrier member 12 configured for placement within a vehicle structural member, e.g. within a cavity of the structural member. The carrier may include one or more cavities 16 extending the length of the carrier. Preferably, the carrier includes one or more applications of activatable material 18 placed thereover.

In another aspect, by example referring to FIGS. 2, 3, 4, 6, 7, and 10, the present invention further contemplates a feature 20 for locating the carrier member 12 to the structural member 14. In one particular embodiment, this locating feature is configured to matingly engage with the carrier member and includes one or more members (e.g. fasteners 22) for placement within apertures 23 or other corresponding recesses defined in the structural member. In one particular embodiment, the locating feature is further configured for attachment to an end portion of the carrier member and more particularly engages one or more cavities and/or opening 16 formed through the carrier. Optionally, the locating feature is shaped and/or sized for spacing the carrier away from the walls of the structure being reinforced to allow passage of fluids such as e-coat.

In yet another aspect, by example referring to FIGS. 1, 2, 5, 6 and 8 through 11, the present invention also contemplates restrictive features, such as restrictors 24, for quick and inexpensive placement and/or locating of the activatable material 18 onto carrier member 12, without the necessary use of fasteners. The carrier member, activatable material or both, may be formed with one or more of these features. Furthermore, other features, such as end caps 20, may also include one or more of these restrictive features. Upon placement of the activatable material onto the carrier, movement of the material is limited and preferably substantially limited by the restrictive features, with respect to the carrier, prior to activation.

It should be appreciated that the above referenced examples are not limiting as other examples and features of the present invention are shown and described herewith.

Carrier

As discussed above, the reinforcing system includes a carrier adapted for placement within a hollow cavity of a structural member. The carrier is preferably configured to extend along an axis and includes at least a first end and a second end which reside on opposite ends of the axis. The carrier may also include one or more hollow cavities which extend along the length or axis of the carrier. The carrier can be straight or contoured along its length.

The carrier is formed of one or more walls that extend along the length of the carrier, which may be joined or otherwise integrated together. The carrier may have separate pieces that are separately made and then assembled together, it may be integrally formed, or both. Optionally, it is contemplated that the one or more of the walls may be internal walls located substantially within exterior walls of the carrier. Preferably, upon joining of the walls, the carrier forms one or more (or a plurality) of cavities (e.g., 1, 2, 3, 4, 5, 6 or more cavities) that extends along at least a portion of the length of the carrier and more preferably the entire length. It is contemplated that the one or more cavities may form openings extending through the carrier between the first and second ends of the carrier, thereby allowing the passage of fluids or other components through the carrier.

By example, referring to FIGS. 1 and 5, the carrier 12 may be formed of a plurality of walls 26 which extend both internal and external to the carrier and along the length thereof to form a plurality of cavities. In this configuration, the carrier includes a first cavity 16A, second cavity 16B, third cavity 16C and fourth cavity 16D. Of course other configurations are contemplated.

Referring to FIGS. 1 and 2, it is contemplated that one or more of the walls 26 of the carrier 12 may be located adjacent an interior wall 30 of the structural member 14 in which it is placed. Also, it is contemplated that the cross-sectional profile of the carrier, as defined by the walls 26, or otherwise, may correspond to the cross-sectional opening formed by the interior walls of the structural member. Accordingly, four or more walls may be located adjacent the interior structural members.

Optionally, the carrier may include one or more through holes 32 formed in the walls of the carrier. The through holes may provide reduced weight of the carrier. The through holes may also be used to directly control any flow of the activatable material, or otherwise. Still further, the through holes may be used to engage locating features 20 for locating the carrier within the structural member.

The carrier may be formed of any of a variety of materials and can be formed of a single material or multiple materials. As examples, the carrier may be formed of polymeric materials (e.g., thermoplastics such as polyamide), metals (e.g., aluminum, steel, magnesium, metal alloys) combinations thereof or the like. As will be recognized, the technique for forming and shaping the carrier will typically depend upon the material of the carrier. Examples of techniques include, without limitation, molding (e.g., injection, compression or blow molded), stamping, hydroforming, extruding or otherwise. Examples of suitable materials and forming processes can be found in commonly owned U.S. Pat. No. 6,467,834, to Barz et al., the entire contents of which are herein incorporated by reference for all purposes.

Activatable Material

The system 10 includes an activatable material 18 configured for providing structural reinforcement properties upon activation and curing thereof. In one configuration, the carrier includes activatable material located over the carrier. The activatable material may comprise an adhesive material, or otherwise includes adhesive qualities, for bonding to the carrier and structural member upon activation thereof.

Preferably, the activatable material is restrictively placed over the carrier (via restrictor 24 or otherwise) such that movement of the activatable material is limited or substantially limited with respect to the carrier. In doing so, in some instances, the activatable material, the restrictors, or both, may be elastically or plastically deformable for placement of the activatable material within one or more restrictive features, between restrictive features or otherwise such that the configuration of the restrictive features and/or activatable material limits or substantially limits movement of the activatable material with respect to the carrier.

The activatable material may be an expandable or foamable material that is activated (e.g. by heat, moisture, radiation, chemical reaction or otherwise) to expand and then cure to form a strong bond between adjacent surfaces (e.g. attachment surfaces of the carrier and structural member or otherwise). In one embodiment, the activatable material is formed of a high compressive strength heat activated reinforcement material having foamable characteristics. In another embodiment, the activatable material may be particularly suited for vibrational dampening for stability to the structural member, reduce acoustic noise through the structural material or both. The material may be generally dry to the touch or tacky and can be placed upon surfaces of members in any form of desired pattern, placement, or thickness, but is preferably a substantially uniform thickness.

Though other heat activated materials are possible for the activatable material, a preferred heat activated material is an expandable plastic, and preferably one that is foamable. A particularly preferred material is an epoxy-based structural foam. For example, without limitation, the structural foam may be an epoxy-based material, including an ethylene copolymer or terpolymer that may possess an alpha-olefin.

Examples of suitable activatable materials can be found in commonly owned U.S. Pat. Nos. 6,846,559, 6,941,719 and 6,921,130, herein entirely incorporated for all purposes. In particular, one exemplary expandable material is L-5204 structural foam available through L&L Products, Inc. of Romeo, Mich. An example of a preferred structural foam formulation for the adhesive material is an epoxy-based material that is commercially available from L&L Products of Romeo, Mich., under the designations L5206, L5207, L5208, L5209, L-5220, L-7102, L-7220, XP321 and XP721 or others.

The preferred materials can be processed by injection molding, extrusion compression molding or with a mini-applicator, for example according to the teaching of U.S. Pat. Nos. 7,048,019 and 5,358,397 herein entirely incorporated by reference for all purposes. This enables the formation and creation of part designs that exceed the capability of most prior art materials. In one preferred embodiment, the activatable material (in its uncured state) generally is dry or relatively free of tack to the touch. Moreover, the activatable materials may be applied to the attachment surfaces of the carrier members and/or connectors (e.g. end caps or otherwise) before or after assembly of those components together. In addition, as discussed previously, preformed patterns may also be employed such as those made by extruding a sheet (having a flat or contoured surface) and then die cutting it according to a predetermined configuration in accordance with the chosen structure, panel or beam, and applying it thereto.

As previously mentioned, the activatable material may be a heat activated, thermally expanding material. The material may become reactive at higher processing temperatures, such as those encountered in an automobile assembly plant, when the material is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Other exemplary activatable materials can include combinations of two or more of the following: epoxy resin, polystyrene, styrene butadiene-styrene (SBS) block copolymer, butadiene acrylo-nitrile rubber, amorphous silica, glass microspheres, azodicarbonamide, urea, dicyandiamide. See also, U.S. Pat. Nos. 6,649,243, 6,519,854, 6,387,470, 6,546,693, 6,332,737, and 6,003,274. [SAC to provide these Sika patent numbers. This should cover their acoustical foams and patented composition just took out in the EPO opposition]

Placement of Activatable Material

The activatable material 18 is located adjacent to the exterior portion of the carrier 12, and may be in contact therewith or spaced therefrom. Preferably, the activatable material remains proximate to the carrier during placement within the structural member 14 or otherwise. The activatable material, carrier or both may include a restrictive feature for locating the activatable material proximate to the carrier. Preferably, the restrictive feature also limits or substantially limits movement of the activatable material with respect to the carrier. Optionally, as described herein, the activatable material may also be placed on or with other components associated with the carrier, such as end caps, or otherwise.

In a first configuration, referring to FIGS. 1, 2, 5, 6 and 8 through 11, the activatable material is restrictively located onto the carrier to limit or substantially limited movement of the material with respect to the carrier. Advantageously, placing and locating of the activatable material relative to the carrier may be performed without the use of fasteners. In one preferred configuration, the restrictive placement of the activatable material is achieved through restrictors 24 placed or formed with the carrier, activatable material, or both.

The one or more restrictors 24 may be placed or formed upon one or more wall portions of the carrier. This may include opposing wall portions, four generally outwardly facing wall portions (for example, two opposite walls generally perpendicular to two other opposite walls), or otherwise. Preferably, the restrictors are located on an exterior portion of the carrier. More preferably, the restrictors are located adjacent the wall portions defining the structural member when the carrier is placed therein. The restrictors may be located on 1, 2, 3, 4 or more walls, including substantially all of the walls forming the carrier or extending along the axis of the carrier.

Referring to FIGS. 1, 2, 5, 6, 9A, 9B and 10, examples of a first restrictor configuration is shown. In this configuration, the restrictor comprises or includes a slotted portion 34 that extends along the length carrier wall. The slotted portion includes a cross-sectional open area comprising generally of a rectangle having a width and height. However, other shapes are contemplated including circular, elliptical, square, triangle, or otherwise. The cross-sectional open area may be generally consistent through the length of the carrier. The slotted portion may also include an opening or groove 36 which extends along the length of the carrier. The groove is located on an outer portion of the carrier for receiving the activatable material or allowing the activatable material to exit the slotted portion during activation thereof.

As the slotted portion is configured for receiving the activatable material, the activatable material may have a cross-sectional shape corresponding to the cross-sectional shape of the slotted portion. The activatable material may extend along substantially all or a portion of the slotted portion and may comprise a strip or other configuration. In one configuration, the activatable material may be inserted into the end of the slotted portion. Alternatively, the activatable material may be snapped into the slotted portion, via the groove extending along the slotted portion. Either way, or otherwise, a friction fit may be created between the slotted portion and the activatable material to prevent the activatable material from exiting therefrom.

The carrier may include one or more stops 38 for preventing or limiting movement of the activatable material within slotted portion. The stops may be integrally formed with the carrier or separately formed. In one configuration, the stops comprise one or more pins or clips that extending through an opening formed in the slotted portion of the carrier. By extending into the slotted portion the pins or clips prevent or limit movement of the activatable material along the slotted portion.

Referring to FIGS. 8 and 8A-8D, examples of a second restrictor configuration are shown. In this configuration, the restrictor comprises or includes one or more features extending from the carrier, activatable material, or both, adapted to limit movement of the activatable material in at least one direction. The restrictors may be separately formed and attached to the carrier or may be integrally formed with the carrier to form a unitary structure, as with all restrictor configurations described herein. As shown in drawings, the restrictors comprise one or more, and preferably opposing members extending from the carrier, each forming a cavity and/or opening for receiving the activatable material and forming an end stop 40 for limiting movement of the activatable material parallel to the carrier axis, perpendicular to the carrier axis, or both. For example, the stops may be configured to prevent the material from moving therepast, either prior to, during or after activation of the activatable material. Also, the stops may be configured to prevent movement along the axis of the carrier but allow movement in a direction non-parallel to the carrier axis. Alternatively, the stops may be configured to allow parallel movement with respect to the carrier axis but prevent non-parallel movement. The one or more end stops may include one or more tabs, protections, or otherwise, 42 configured to prevent movement of the activatable material perpendicular to the axis of the carrier.

In a first example, referring to FIG. 8, the restrictors are formed of a raised portion extending from one of the carrier walls. The restrictor includes a top wall and sidewalls joining the top wall to the carrier wall, wherein each of the restrictors forms a cavity and includes an opening extending in the direction of an opposing restrictor. The cavities and/or openings, as with each of the restrictors described herein, may include a cross-sectional shape generally corresponding to a portion of the activatable material.

In a second example, referring to FIG. 8A, the restrictors may be formed of a turned up portion of the carrier wall that extends outwardly from the carrier wall and back towards an opposing restrictor to form at least a portion of a cavity and opening extending towards the opposing restrictor. The restrictors include sides wall tabs 42 extending from the carrier wall for limiting or preventing lateral movement of the activatable material.

Figure 8C:
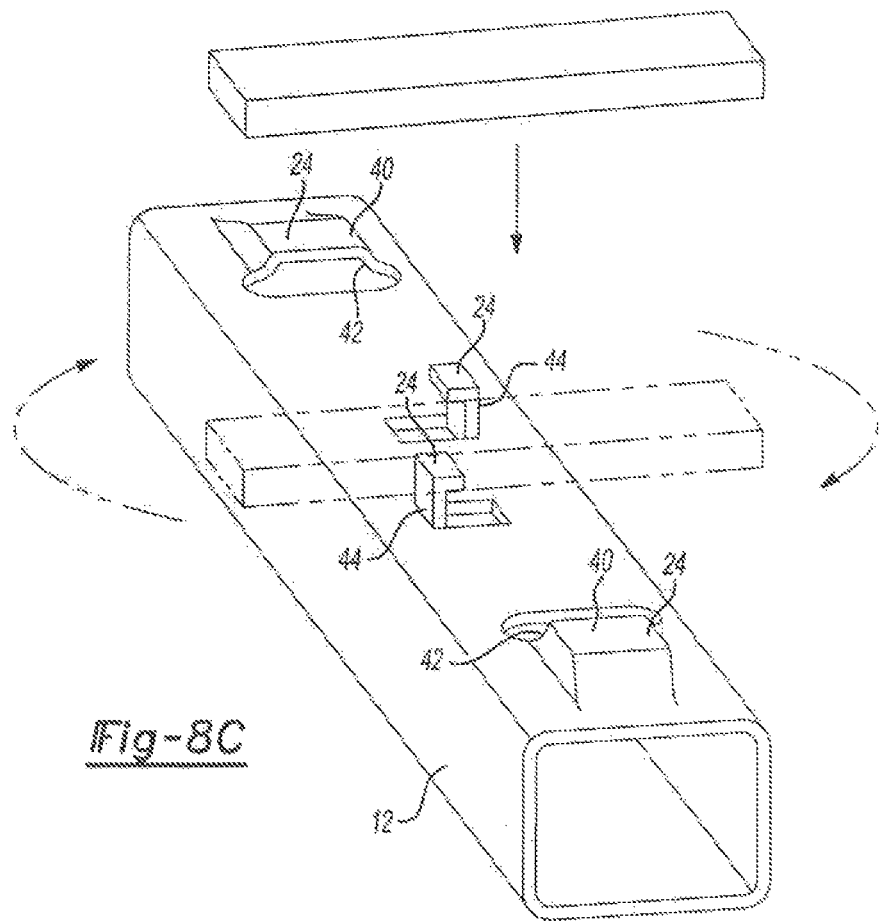
Figure 8D:
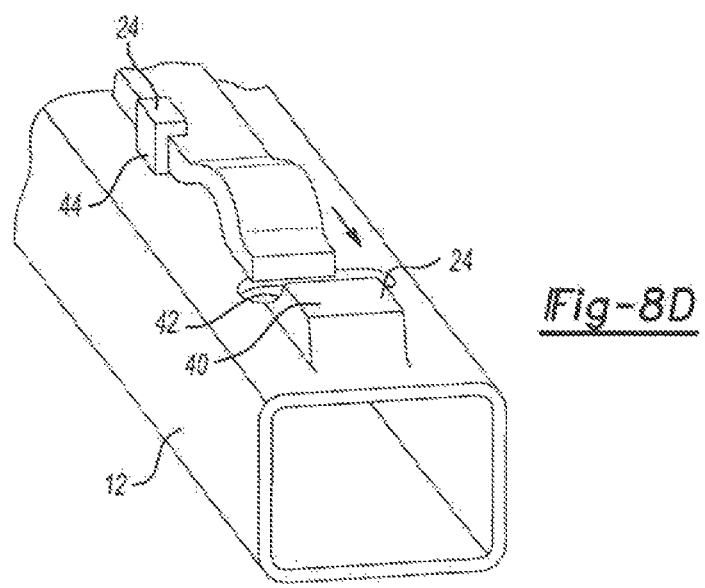

The restrictive features may include one or more intermediate restrictors, e.g. tabs, projections, recess, opening, or otherwise, 44 located between the restrictor end stops for preventing movement generally perpendicular to a line extending between the end stops. For example, in the example shown in FIG. 8, the intermediate stop includes two generally adjacent tabs or stops having oppositely facing openings. The restrictors extend from the carrier wall and generally back towards the opposing intermediate restrictor. In this configuration, referring to FIG. 8C, the oppositely facing openings formed by the intermediate restrictors allow a strip of activatable material 46 to be placed between the intermediate restrictors and rotated into the openings thereby substantially preventing the strip of activatable material to move away from the walls of the carrier. In another example, referring to FIG. 8B, the intermediate restrictor comprises one or more openings formed through the carrier members for receiving a strip of activatable material and preventing perpendicular movement with respect to the carrier axis. Upon placement into the openings, the strip of activatable material may be plastically and/or elastically deformed such that the end portions can be placed into openings formed by the end stop restrictors, as shown in FIG. 8D.

Referring to FIG. 11, a third example of a restrictor configuration is shown. In this configuration, the restrictor comprises or includes one or more engagement features 48 located with the reinforcement material and configured to engage one or more corresponding engagement features 50 located with the carrier. The engagement features may be integrally formed or formed separate from the reinforcement material and carrier. In one configuration, the engagement features comprise a protrusion extending from the activatable material configured to engage an opening formed in the carrier. Optionally, one or more stops 38 may be further used to limit or substantially limit movement of the activatable material, carrier, or both, such that the engagement features do not disengage.

In another configuration, referring to FIGS. 3 and 7, the activatable material may be placed over a portion of an end cap 20 which is configured for engagement with a carrier. The material may be located externally or internally to the carrier upon attachment of the end cap to the carrier. In one example, the end cap is configured with one or more projections 52 adapted to fit within the cavities or openings formed in the carrier. In this configuration, one or more of the projections include activatable material located thereover. Upon activation, the material adheres the end caps to the inner portion of the carrier. Optionally, the activatable material may also comprise, or otherwise include, an adhesive material configured for bonding to one or more inner portions of the carrier, prior to, during or after activation of the activatable material. The adhesive may comprise a portion of the activatable material or may be applied over the activatable material.

Attachment Features

Optionally, the carrier may include one or more locators for locating the carrier within structural member and maintaining the position of the carrier. Such locators may be integrally formed with the carrier or comprise a separate feature which engages the carrier and structural member. Suitable locators features include protrusions, extensions, tabs, springs, mechanical fasteners (e.g. threaded fasteners, hook and latch, snap fittings, Christmas tree clips, or otherwise). Other locators include non-mechanical fasteners (e.g. friction fittings, adhesives, or otherwise).

The locators may be formed or placed about portions of the carrier. However, in one configuration at least one locator is at the first end of the carrier and at least one locator is at the second end. Thus it is possible to generally orientate the axis of the carrier with the axis of the structural cavity.

End Caps

As previously mentioned, the system can include one or more end caps 20 for placement at the first end, second end, or both ends, of the carrier. The one or more end caps may be configured with one or more features for improving reinforcement of the end cap, structural member or both. Such improvement may comprise positioning of the carrier within the structural member prior to activation of the activatable material, controlling or preventing flow of the activatable material during activation, strengthening of the reinforcement system, structural member, or otherwise.

In one configuration, the end caps may be configured as a sound baffle for inhibiting the transfer of sound, noise, vibration, or the like, along the structural member. In doing so, it is contemplated that the end caps may include an outer portion or walls having a corresponding shape to the interior wall of the structural member. The outer portion or wall of the end cap may substantially or entirely span the opening formed by the structural member in which the carrier and/or end cap is placed in.

Additionally, the end caps may be configured to extend along at least a portion of an axis of the structural member cavity. The end caps may include a length equal to at least about 2%, 5%, 10%, 25% or more of the length of the carrier member. As should be appreciated, the combination of the outer portion or walls and length, the end caps may comprise a stand along reinforcement member in of itself. Accordingly, the end caps may comprise a sound baffle member, reinforcement member or both such as bulkhead.

Optionally, the outer portion or walls of the end caps may include activatable material, as discussed herein, for attachment and/or sealing of the end cap to the structural member. The activatable material may help to inhibit the transferring of sound, noise vibration or otherwise. Furthermore, the activatable material may further reinforce the structural member. The Activatable material may extend along the outer portion or wall of the end cap, along an end portion of the cap, both, or otherwise.

For example, referring to FIGS. 2 through 4, 6, 7 and 10, three examples of the end caps 20 of the present invention are shown. In these examples, the end caps may be configured to cover all or a portion of the openings formed through the carrier, which may control, limit or prevent all or a portion of the activatable material from entering or leaving the cavity of the carrier. The end caps may be placed at the first end, second end or both ends of the carrier.

The end caps may be configured for engagement with the interior surface, exterior surface or both surfaces of the carrier walls. It is contemplated that the engagement of the end caps with the carrier may comprise a friction fit. In one configuration, the friction fit may comprise a friction fit formed between one or more projections 52 and/or activatable material 18 and the interior walls forming a cavity of the carrier. Of course, it is contemplated that the friction fit may be formed with an outwardly extending ring or lip 54 which extends about at least a portion of the end caps and configured for forming a friction fit with the exterior (or interior) walls of the carrier.

The engagement of the end cap may be further improved through the use of an attachment feature for attaching the end caps to the carrier. Suitable attachment features include fiction fit, adhesives, fasteners, snap fittings, hook and latch, combinations thereof, or otherwise. Accordingly, it should be appreciated that the end caps and the carrier may include corresponding portions of an attachment feature. As an example, referring to FIGS. 8, 10, and 12 the attachment feature may comprise a snap fitting 56 configured for engaging a corresponding component located on or with the carrier. For example, the snap fitting may comprise one or more projections 58 extending away from the end cap. The projections may include a lip, latch, flange, or the like, 60 which is configured to engage an opening, recess, groove, or the like, 62 of the carrier. In another example, the attachment feature may comprise a fastener (such as a screw, clip, or otherwise) adapted to extend through openings formed in the carrier, end caps, or both, in order to attach the same.

In one configuration, referring again to FIGS. 2 through 4, 6, 7 and 10, the end caps may be configured with one or more locators 64 for locating the end caps, and hence the carrier, with respect to an interior portion of the structural member. The locator may comprise a portion or the end cap or a separate component. In one configuration, referring to FIG. 10, the end cap included an integrally formed locator configured to engage a corresponding component of the structural member. Alternatively, referring to FIGS. 2 through 4, the locator may comprise a separate component configured for engagement with both the end cap and the structural member.

Preferably, the end caps and locators locate the carrier such that the amount of contact between the carrier, end cap, activatable material, or combinations thereof and the structural member is minimized. This is desirable as the structural members may be subjected to anti-corrosion treatments (such as e-coating, or otherwise) for assisting in the prevention of corrosion. However, as previously mentioned . . . .

Suitable locators that may be used include fasteners such as clips (e.g. a 'Christmas tree' shaped clip), or the like.

In yet another example, referring again to FIGS. 2 through 4, 6, 7 and 10, the end caps may also be configured for controlling the activatable material from entering or leaving the carrier cavity. In this configuration, the end caps may cover all or a portion of the openings formed through the carrier by the one or more cavities. In doing so, the end caps may include one or more openings 66 for allowing fluid (e.g. activating material, e-coating for the structural member, or otherwise) to flow therethough.

Advantageously, the end cap may include one or more reinforcement features integrally formed, or attached thereto, for providing additional support to the end caps, carrier, or both. Particularly, the additional support may provide resistance to lateral forces with respect to the axis of the carrier, or otherwise. For example, referring to FIGS. 3 and 7, the reinforcement feature may comprise one or more internally formed ribs 68. In the configurations show, the ribs are formed within the projections extending from the end caps which are adapted for insertion and attachment to the carrier. Accordingly, it is contemplated that the end caps may be configured to provide additional reinforcement of the carrier by inserting one or more projections, ribs, or both, which are configured for attachment to an internal portion of the carrier, through adhesive and/or activatable material, such that additional support against lateral forces, or otherwise, is provided. Other reinforcement configurations are contemplated.

In another configuration, the end caps may be configured to limit movement of the activatable material placed on the carrier. For example, referring to FIGS. 2 through 4, 6, 7 and 10, the end caps may include an outwardly extending flange or lip 70 which extends to or beyond the outer circumference of the carrier walls. In doing so, restrictively place material on the outer or interior portion of the carrier may be prevented from moving beyond the end cap and end portion of the carrier.

In still another configuration, it is contemplated that the end caps may be alternatively attached directly to an end portion of a structural member (as oppose to the carrier), as described herein, to provide reinforcement of the structural member, limit flow of any expandable material located within or external to the structural member, or otherwise.

The end caps may be formed of any suitable material including metal, plastic, rubber, ceramic, or otherwise. However, in one preferred configuration, the end caps are formed of a lightweight material such as a plastic and more preferable a thermoplastic or thermoset plastic. The material of the end caps may be the same as the carrier or different. It is contemplated, as described herein, that the end cap may be integrally formed with the carrier through a molding process, such as blow molding, rotational molding or otherwise.

Applications

The reinforcing system of the present invention may be used in a variety of applications which includes a structural member and which may benefit from reinforcement thereof. In one particular application, the system may be used in the vehicular industry for reinforcing structural systems thereof to form a reinforced structural member. In doing so, any of the systems herein can be placed in a structural member and activated to form the reinforced structural member.

For example, it is contemplated that the system may be used to reinforce various structural members of a vehicle including frame, frame rails, rockers, pillars, roof members, or otherwise. The structural member may comprise one or more frame components (such as tubular frame members or otherwise) extending the length of a vehicle and/or other frame members located therebetween (e.g. rocker frame members). In one particularly advantageous application, the system may be used to reinforce a frame rail, rocker, or the like depending on the type of frame (e.g. unibody, etc.).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A reinforcement system for a structural member, the system comprising:
   a carrier having a length extending between a first end and a second end, the carrier including one or more sidewalls joined together to form one or more cavities extending along the length of the carrier, the carrier including a cross-sectional shape roughly corresponding to the cross-sectional shape of interior walls of a hollow structural member;
   one or more end caps configured for engagement with the interior surface and exterior surface of the sidewalls, the one or more end caps including:
   (i) one or more projections for forming a friction fit with the interior surface of the sidewalls;
   (ii) a locator including an opening or receiving a fastener for locating the one or more end caps and thus the carrier within the hollow structural member; and
   (iii) one or more openings for allowing fluid to flow through the carrier.

2. The reinforcement system of claim 1, including one or more restricting features comprising a slotted portion having a cross-sectional shape corresponding roughly to a portion of an activatable material prior to activation.

3. The reinforcement system of claim 2, wherein the slotted portion limits movement of the activatable material in a direction parallel to an axis of the carrier and in a direction perpendicular to the axis.

4. The reinforcement system of claim 2, wherein the slotted portion is formed of a raised portion of one of the carrier sidewalls and are integrally formed with the carrier to form a unitary structure.

5. The reinforcement system of claim 2, wherein the one or more restricting features further includes one or more stops extending into the slotted portion for limiting movement of the activatable material in a direction parallel to a carrier axis.

6. A reinforcement system for a structural member, the system comprising:
   a carrier having a length extending along an axis between a first end and a second end, the carrier including one or more sidewalls joined together to form a plurality of cavities extending along the length of the carrier, the carrier including a cross-sectional shape roughly corresponding to the cross-sectional shape of interior walls of a hollow structural member;
   an activatable material placed over the carrier, the activatable material is configured to expand upon application of heat and adhere to the interior walls of the hollow structural member to provide reinforcement of the same; and
   one or more restricting features located on or integrated with the carrier, the one or more restricting features being configured to receive the activatable material and limit movement of the activatable material with respect to the carrier;
   one or more end caps configured for engagement with the interior surface and exterior surface of the sidewalls, the one or more end caps including:
   (i) one or more projections for forming a friction fit with the interior surface of the sidewalls;
   (ii) a locator including an opening for receiving a fastener for locating the one or more end caps and thus the carrier within the hollow structural member; and
   (iii) one or more openings for allowing fluid to flow through the carrier.

7. A reinforcement system for a structural member, the system comprising:
   a carrier having a length extending along an axis between a first end and a second end, the carrier including one or more sidewalls joined together to form a plurality of cavities extending along the axis and consecutively arranged along a height or width of the carrier, the carrier including a cross-sectional shape roughly corresponding to the cross-sectional shape of interior walls of a hollow structural member;
   a plurality of strips of activatable material placed over the carrier, the activatable strips being configured to expand upon application of heat and adhere to the interior was of the hollow structural member to provide reinforcement of the same;
   one or more restricting features integrally formed with the carrier to form a unitary structure, the one or more restricting features being configured to receive the strips of activatable material and limit movement of the activatable material with respect to the carrier;
one or more end caps configured for engagement with the interior surface and exterior surface of the sidewalls, the one or more end caps including:
  (i) one or more projections for forming a friction fit with the interior surface of the sidewalls;
  (ii) a locator including an opening for receiving a fastener for locating the one or more end caps and thus the carrier within the hollow structural member; and
  (iii) one or more openings for allowing fluid to flow through the carrier.

* * * * *